(12) United States Patent
Forster et al.

(10) Patent No.: US 6,580,357 B1
(45) Date of Patent: Jun. 17, 2003

(54) HANDLE TAG FOR IDENTIFICATION OF A CONTAINER

(75) Inventors: Ian J. Forster, Essex (GB); Patrick F. King, Glen Ellyn, IL (US)

(73) Assignee: Marconi Communications Inc., Warrendale, PA (US)

( * ) Notice: Subject to any disclaimer, the term of this patent is extended or adjusted under 35 U.S.C. 154(b) by 0 days.

(21) Appl. No.: 09/503,607

(22) Filed: Feb. 11, 2000

(51) Int. Cl.$^7$ ................................................ H04Q 5/22
(52) U.S. Cl. ................... 340/10.1; 340/5.5; 340/825.31
(58) Field of Search .................... 340/10.1, 825.36, 340/825.49, 825.69, 825.31, 5.5, 572.8

(56) References Cited

U.S. PATENT DOCUMENTS

| | | | |
|---|---|---|---|
| 3,787,993 A | 1/1974 | Lyon | 40/306 |
| 4,862,160 A | 8/1989 | Ekchian et al. | 340/825.54 |
| 5,631,631 A | 5/1997 | Deschenes | 340/572 |
| 5,767,772 A | 6/1998 | Lemaire et al. | 340/571 |
| 5,779,839 A | 7/1998 | Tuttle et al. | 156/213 |
| 5,798,693 A | 8/1998 | Engellenner | 340/505 |
| 5,831,531 A | 11/1998 | Tuttle | 340/572 |
| 5,865,339 A | 2/1999 | Carlson | 220/694 |
| 5,883,376 A | 3/1999 | Rosch et al. | 235/492 |
| 5,887,176 A | 3/1999 | Griffith et al. | 395/750 |
| 5,936,523 A | 8/1999 | West | 340/545.6 |
| 5,953,682 A | 9/1999 | McCarrick et al. | 702/45 |
| 5,972,156 A | 10/1999 | Brady et al. | 156/280 |
| 5,973,611 A * | 10/1999 | Kulha et al. | 340/825.31 |
| 6,023,244 A | 2/2000 | Snygg et al. | 343/700 |
| 6,031,459 A | 2/2000 | Lake | 340/572.8 |
| 6,204,764 B1 * | 3/2001 | Maloney | 340/568.1 |

FOREIGN PATENT DOCUMENTS

| | | |
|---|---|---|
| DE | 44 46 203 A1 | 6/1996 |
| DE | 295 04 712 U | 7/1996 |
| DE | 197 03 819 C1 | 8/1998 |
| DE | 197 03 819 C | 8/1998 |
| FR | 2681972 A | 4/1993 |
| GB | 974 249 A | 11/1964 |
| GB | 2 092 096 A | 8/1982 |
| GB | 2 210 349 A | 6/1989 |
| GB | 2 293 588 A | 4/1996 |
| WO | WO 94/05090 | 3/1994 |
| WO | WO 95/15622 | 6/1995 |
| WO | WO 99/18000 | 4/1999 |

\* cited by examiner

*Primary Examiner*—Michael Horabik
*Assistant Examiner*—M Shimizu
(74) *Attorney, Agent, or Firm*—Withrow & Terranova PLLC

(57) ABSTRACT

A handle containing a wireless communication device for attachment to a container. The handle includes a body portion having an opening that aligns with and mounts against a handle in the container. The wireless communication device is mounted within the handle and preferably includes an identification chip and antenna for transmitting signals indicative of the container and the location. The wireless communication device may communicate with an interrogation reader for transferring information regarding the container and/or contents of the container. A central control system may be connected to each interrogation reader for controlling the overall movement of the container.

19 Claims, 5 Drawing Sheets

HANDLE TAG FOR IDENTIFICATION OF A CONTAINER

BACKGROUND OF THE INVENTION

The present invention relates generally to a device for monitoring the location of a container and, more particularly, to an identification device having a handle tag containing a wireless communication device for attachment to a container.

BACKGROUND OF THE INVENTION

It is often necessary to monitor the location and movement of materials within a distribution center or manufacturing facility. One method of tracking the materials is to attach a wireless communication device such as a radio frequency identification (RFID) transponder or other identification device to containers that are housing the materials. By way of example, a liquid container such as a bottle or keg may include an identification device indicative of the liquid contained inside. An interrogation reader, or series of receivers, having an antenna device and able to send information remotely through electronic signals, is placed throughout the distribution or manufacturing facility to receive signals transmitted from the identification devices. The signals are then passed to a central control system that monitors and records the applicable information. The central control system can also send information to its interrogation readers to send to the transponders for response and/or to be stored in the transponder's memory.

The identification system also allows for statistical analysis of the materials to maintain an accurate inventory, production flow rates, and other production standards. Additionally, the identification devices may include specific information about the materials housed within the containers including date of manufacture, place of manufacture, type of product within the container, the temperature of the container and ambient air, the temperature of the contents of the container, the pressure of the container, etc.

A problem occurs when the containers are not conducive for mounting an identification device or transponder. One example is a beer keg that has a substantially cylindrical shape with smooth, uniform outer walls. There are no extensions or areas for effectively attaching the identification device. Additionally, these containers may be heavy and cumbersome to handle. During the filling process and distribution, the containers may bang against other containers, storage racks, conveyor equipment, etc. An identification device attached to the container may easily be damaged or destroyed during this process.

Another concern is that the identification devices should be able to be quickly mounted to the containers. Each container should be identified with a separate identification device. The labor cost would be excessive and outweigh the benefits of the identification system if each device was timely to mount to the containers. Therefore, it is important that the identification devices can be quickly attached to each of the individual devices. Inherent with the quick attachment, the devices should be mounted in a straightforward manner that is not overly difficult.

In addition to be quickly attached, the identification tags should also securely attach to the containers. Secure attachment should prevent the tags from inadvertently falling off the containers even during handling of the containers during which they may be dropped, bounced around, and otherwise roughly handled.

It is also important that the identification tags be attached in an inconspicuous manner. For reusable containers that are sent to the consumers and then returned to be refilled and redistributed, an inconspicuous placement will help to ensure that the consumers do not tamper with or otherwise destroy the identification tag. An inconspicuous placement, such as within the enclosed rim of a keg, may also help to shield the identification tag from damage while being handled.

SUMMARY OF THE INVENTION

The present invention is directed to an identification device for mounting adjacent to a handle opening in a container. The invention includes a handle tag having a body portion with an opening that is sized to align with the container opening. Inserts may extend from the body portion for mounting the device to the container. Other means of mounting the device include an adhesive, or mechanical fastener such as a screw of bolt. A wireless communication device is mounted within the handle tag for transmitting information regarding the container. The wireless communication device may include an identification chip and antenna.

The handle tag allows for mounting the wireless communication device to the container. Because of the shape and dimensions of the container, attachment in other manners is difficult and ineffective.

Once the identification device is attached to the container, it may communicate with at least one interrogation reader. The identification device and interrogation reader pass information regarding the container and/or contents of the container. More than one interrogation reader may be positioned along the route traveled by the container. Additionally, a central control system may be in communication with the interrogation readers for tracking the overall movement and contents of the container.

DETAILED DESCRIPTION OF THE INVENTION

Figure 1:
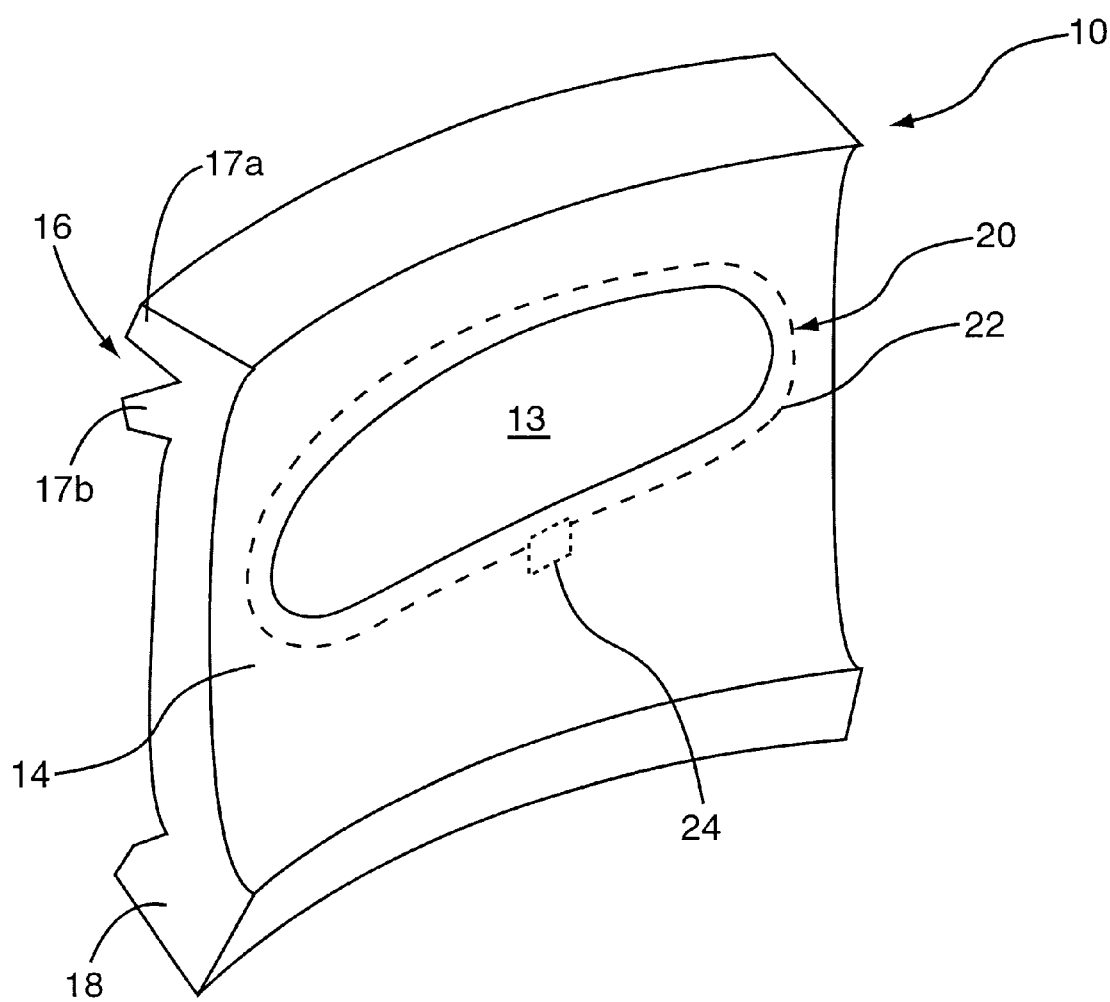
FIG. 1 is a perspective view of a handle tag with integrated wireless communication device constructed in accordance with one embodiment of the present invention.

Referring now to the drawings in general and FIG. 1 in particular, it will be understood that the illustrations are for purpose of describing a preferred embodiment of the invention and are not intended to limit the invention thereto. As seen in FIG. 1, a handle tag with an integrated wireless communication device, generally designated 10, is shown constructed according to the present invention. The handle tag 10 includes an attached wireless communication device 20 for identifying a container 30.

Figure 2:
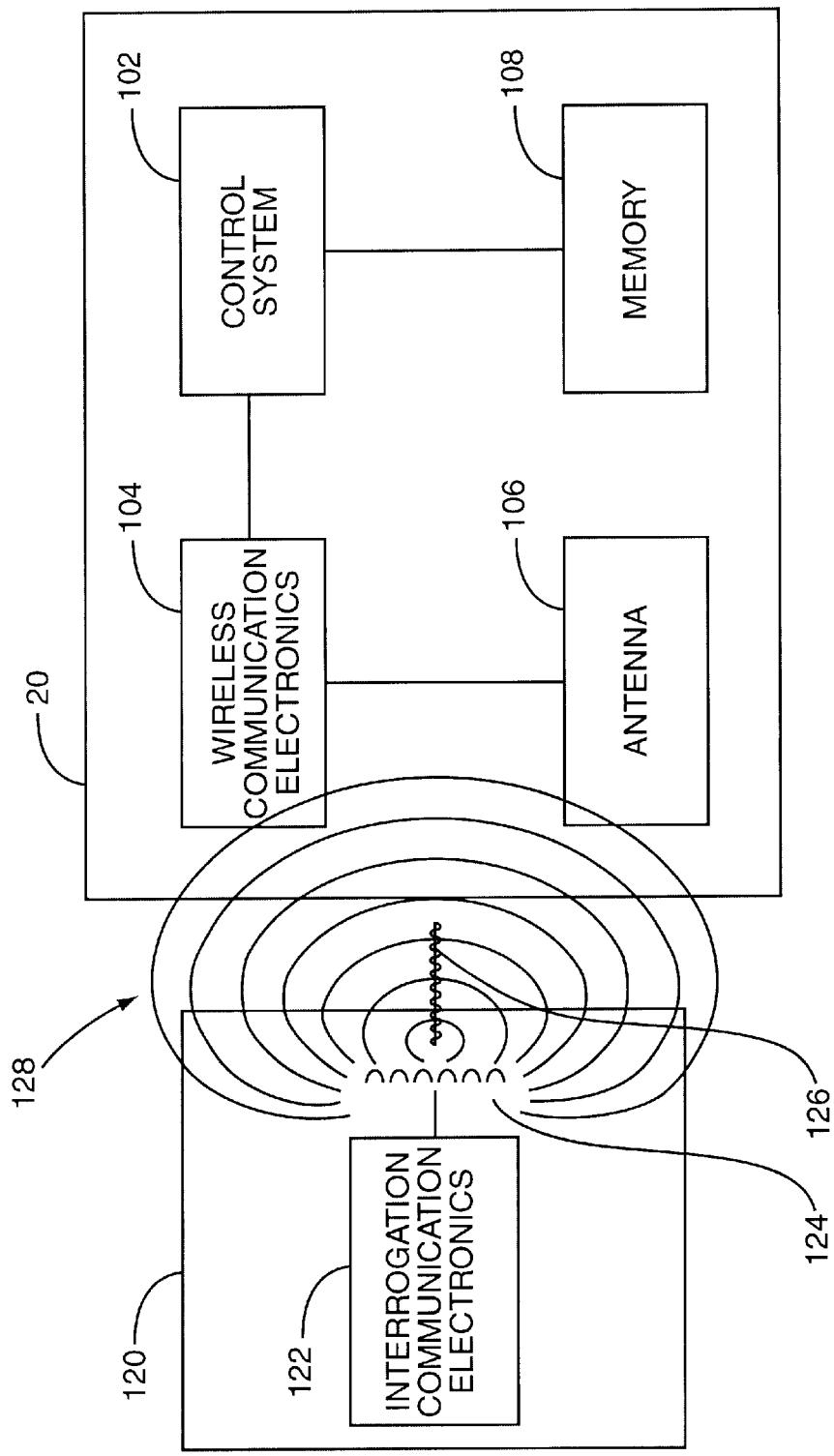
FIG. 2 is a schematic illustration of the communication between the wireless communication device and an interrogation reader.

FIG. 2 illustrates one particular type of wireless communication device 20 called a radio frequency transponder. One of ordinary skill in the art will understand that there are many other different types of wireless identification devices 20 that allow electronic communication and the present invention is not limited to any one particular type. The transponder 20 is usually made out of some type of plastic or other material having within it control system 102, wireless communication electronics 104, antenna 106, and memory 108. The antenna 106 may be either external or incorporated internal to the transponder 20.

The control system 102 is an integrated circuit or other type of microprocessor or micro-controller electronics that controls the substantive operations of the transponder 20. The control system 102 is connected to the wireless communication electronics 104 to communicate and receive transmissions. The control system 102 is also connected to memory 108 for storing information and retrieving information.

FIG. 2 also depicts how communication is achieved with the transponder 20. An interrogation reader 120 contains interrogation communication electronics 122 and an interrogation antenna 124. The interrogation reader 120 communicates to the transponder 20 by emitting an electronic signal or command modulated in a frequency 126 through the interrogation antenna 124. The interrogation antenna 124 may be any type of antenna that can radiate the modulated signal 126 through a field 128 so that a compatible device such as a transponder 20 can receive such signal 126 through its own antenna 106. The field 128 could be any of a variety of different types used in electronic communications including electro-magnetic, magnetic, or electric. The signal 126 is a message containing information and/or specific instructions for the transponder 20.

When the transponder antenna 106 is in the presence of the field 128 emitted by the interrogation reader antenna 124, the wireless communication electronics 104 are energized thereby energizing the transponder 20. The transponder 20 remains energized so long as its antenna 106 is in the field 128 of the interrogation reader 120. The wireless communication electronics 104 demodulate the signal 126 and send the message containing information and/or specific instructions to the control system 102 for appropriate actions. For example, the request in the message may be for the transponder 20 to send back information about the materials housed within the container 30 including date of manufacture, place of manufacture, and type of product within the container. The message may also be instructions to send back information regarding the temperature of the container, its ambient air, the temperature of the contents of the container, the pressure of the container, etc. The transponder 20 sends back information to the interrogation reader 120 by altering the contents of the signal 126.

Alternative forms exist for communicating with a wireless electronic device such as a transponder 20. For instance, the transponder 20 may have a transmitter so that it can send information to the interrogation reader without having to use the signal 126 as the means for communication. The transponder 20 may contain a battery to power the transmitter, or an energy storage unit that is charged by the energy when the transponder is in the field 128 of the signal 126. It is understood to one of ordinary skill in the art there are many other manners in which to communicate with a wireless identification device such as a transponder 20, and that the present invention is not limited to the particular manner described above.

Figure 3:
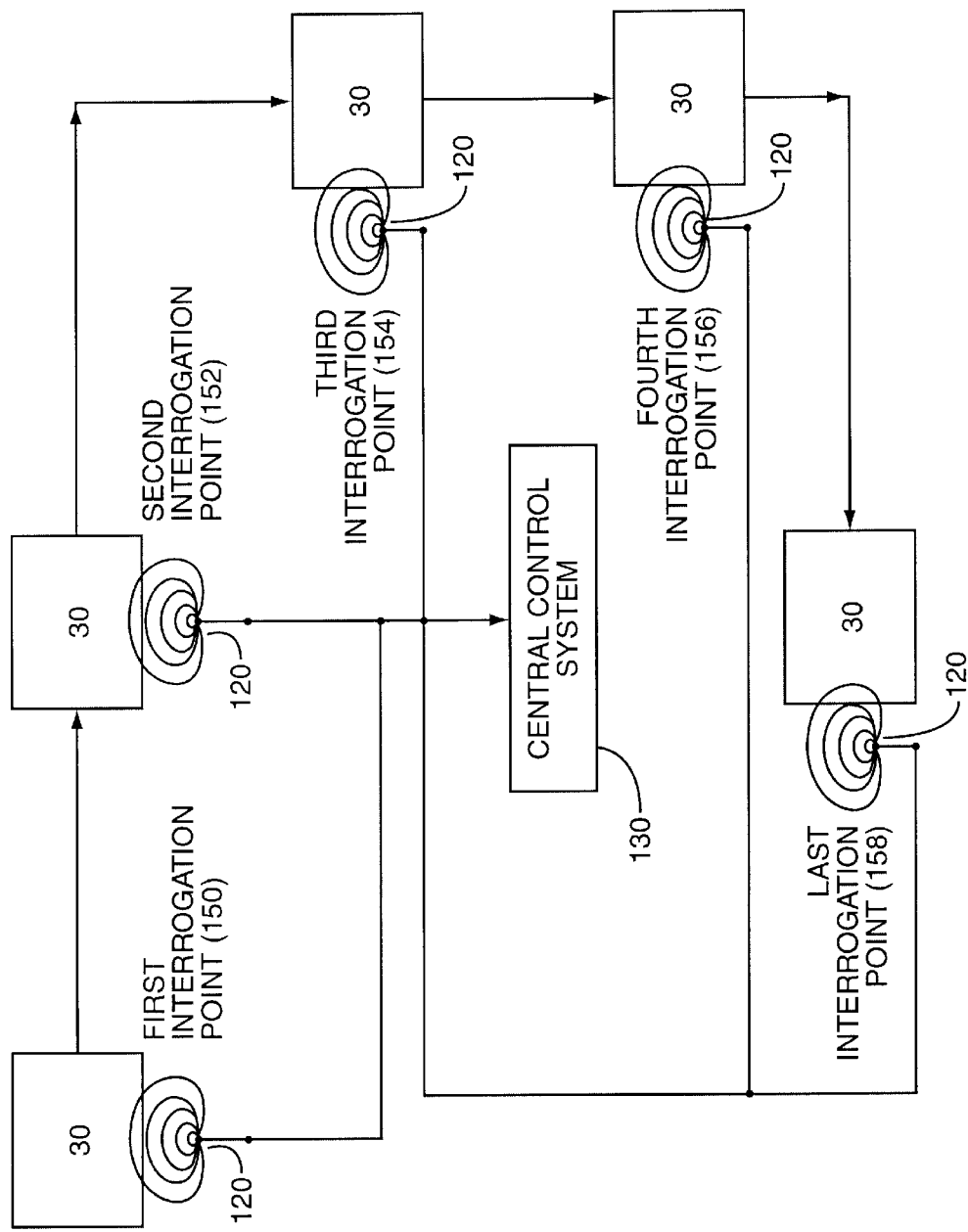
FIG. 3 is a schematic illustration of a tracking system for monitoring the wireless communication device.

FIG. 3 illustrates a tracking system in which containers 30 containing transponders 20 can be tracked through an environment such as factory or distribution facility. For example, the transponder 20 connected to container 30 could pass a first interrogation point 150 that includes an interrogation reader 120. When the container 30 and its transponder 20 is in the presence of the interrogation reader 120 as described previously, a message containing information and/or a specific request for information may be transmitted by the interrogation reader 120 and received by the transponder 20. This process continues as the container 30 moves to a second interrogation point 152, a third interrogation point 154, a fourth interrogation point 156, and on to a last interrogation point 158.

A central control system 130 maintains the information from the interrogation readers 120 and monitors the movement of the containers 30 through the facility. The information received by each of the interrogation readers 120 may be forwarded to the central control system 130 either through direct wire or LAN connection. The central control system 130 could also send information to the interrogation reader 120 to be transmitted to the transponder 20 for identification purposes. The central control system 130 tracks the expected location of the containers 30 and may be alerted if it expects to receive information about a particular container and does not.

During commissioning of each container 30, it may be necessary to place the container 30 containing the transponder 20 in range of an interrogation reader 120 in order to erase previously stored information in memory 108 or to store particular data or configuration information about the container 30 in memory 108 for later use. Preferably, a separate wireless communication device 20 is preferably mounted on each container 30.

Figure 5A:
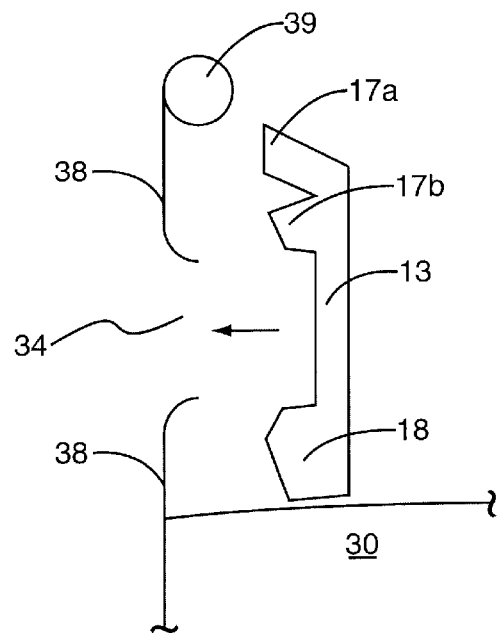
FIG. 5A is a side view of a first step of mounting one embodiment of the handle tag to the container.
Figure 5B:
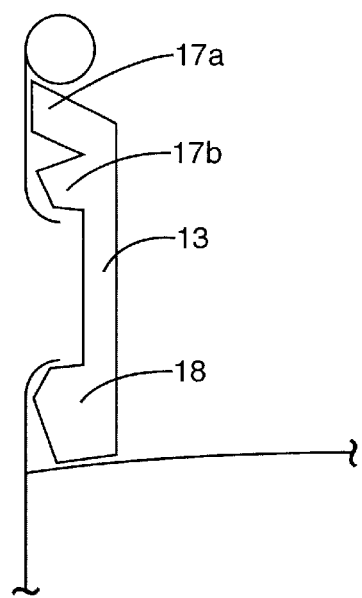
FIG. 5B is a side view of a second step of mounting the handle tag to the container.

A tag 10 is mounted within a portion of the container such that the wireless communication device 20 may send signals indicative of the container and contents of the container. In one embodiment as illustrated in FIGS. 1, 5A, and 5B, the tag includes a body portion 14 having an opening 13 that aligns with an opening 34 in the container. Preferably, the opening 13 is the same size, or slightly smaller then the container opening to cover the container edges which may be sharp and cut the user when grasped. Additionally, a neck (not shown) may extend outward from the edges of the opening 13 to seat against the container opening 34 to further protect the user when handling the container.

A first insert 16 extends from the body portion 14 for attaching the tag 10 to the container 30. The first insert 16 may include fingers 17a, 17b that are spaced apart a distance and compressed together when mounted on the container to hold the tag 10 in position. Various other configurations for the first insert 16 are also contemplated including a single finger, or more than two separate fingers.

A second insert 18 extends from the body portion 14 for further mounting the tag 10. Preferably, the second insert 16 is positioned on an opposing side of the body portion 14 from the first insert 16 that allows for the inserts 16, 18 to work in combination to maintain the tag 10 on the container 30. As with the first insert 16, the second insert may have a variety of shapes and sizes depending upon the dimensions of the container 30.

Another embodiment of the tag 10 features only a body portion 14 with an opening 13. The body portion 14 is attached to the container via an adhesive or fastener, and therefore, may not include inserts.

Figure 4:
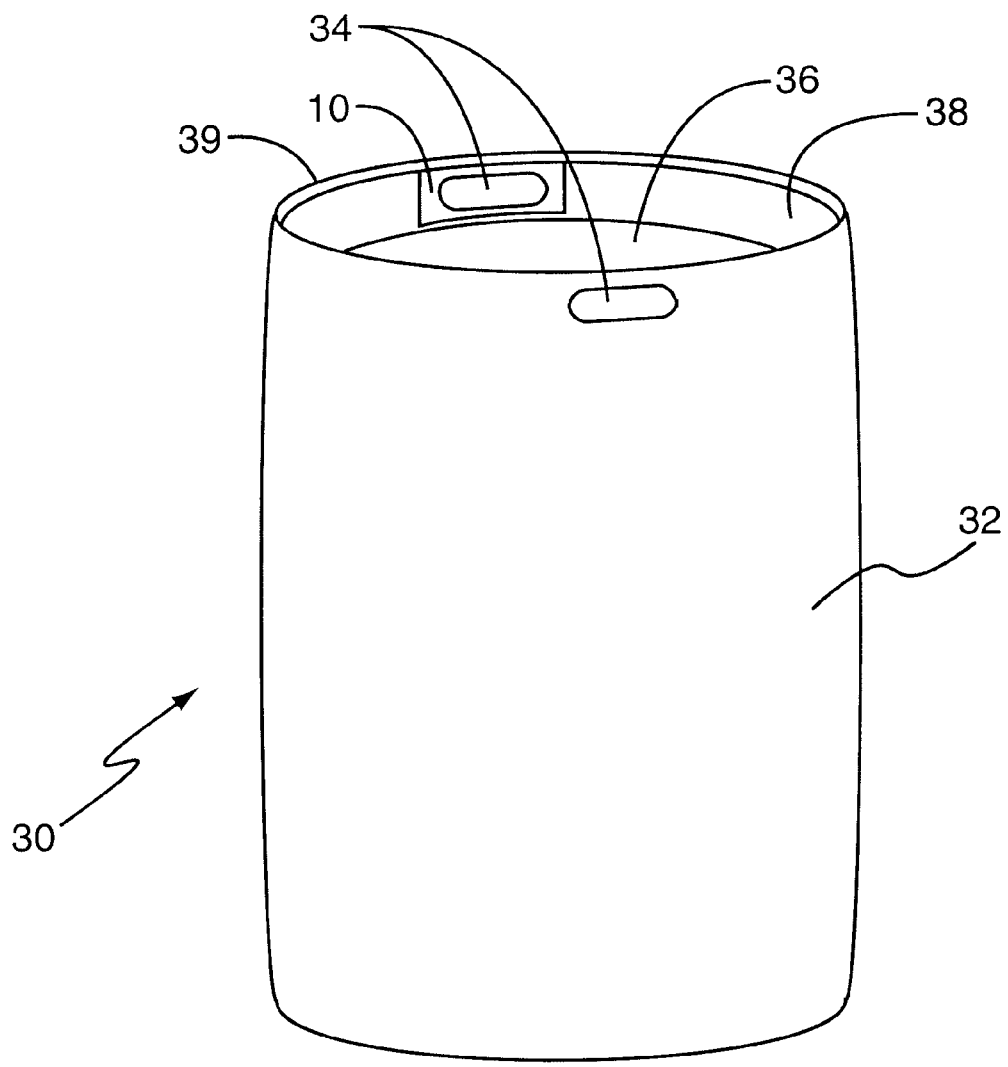
FIG. 4 is a perspective view of the handle tag with integrated wireless communication device attached to a container.

The container 30 may have a variety of shapes and sizes. FIG. 4 illustrates one embodiment of a container 30 having a main body 32 for holding materials. A rim 38 extends outward from a top surface 36 and includes handles 34 for grasping and carrying the container. As illustrated in FIGS. 5A–5B, the edges of the opening 34 may flare inward and may be sharp depending upon the type of rim material. The rim 38 may further include a lip 39 extending around the upper edge opposite the top surface 36. In one embodiment, the container is a keg for holding beer. One skilled in the art will recognize that various other types of containers 30 may be applicable and are to be included within the scope of the present invention.

FIG. 5A illustrates the first step of attaching one embodiment of the handle tag 10 to the container 30. The tag 10 is positioned adjacent to the container handle 34 with the first insert 16 above the handle 34 and the second insert 18 below the handle 34. FIG. 5B illustrates the tag 10 mounted to the container 30. Fingers 17a and 17b are forced together and held in compression between the lip 39 and opening 34. The second insert 18 is positioned between the bottom of the handle and the top surface 36 to further maintain the tag 12 in attachment with the container 30. To make the placement of the wireless communication device 20 less conspicuous, a second handle (not shown) may be attached to the other container handle 34. This second handle does not contain a wireless communication device, but rather gives the appearance that both handles are placed on the container to merely prevent injury to the user.

In the foregoing description, like-reference characters designate like or corresponding parts throughout the several views. Also, it is to be understood that such terms as "forward", "rearward", "left", "right", "upwardly", "downwardly", and the like are words of convenience that are not to be construed as limiting terms. Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. For a container having a handle opening positioned between a main body wall and a lip, an identification device for tracking the container comprising:

a tag having: (i) a body portion with an aperture aligned with the handle opening; (ii) a first insert extending from said body portion and extending between a bottom edge of the handle opening and the main body wall; and (iii) a second insert extending from said body portion and positioned between a top edge of the handle opening and the lip; and a wireless communication device attached to said tag.

2. The device of claim 1, wherein said wireless communication device is mounted within said body portion.

3. The device of claim 2, wherein said wireless communication device includes a transponder and an antenna.

4. The device of claim 3, wherein said antenna extends around at least a portion of said handle opening.

5. The device of claim 1, wherein at least one of said first or second inserts includes a pair of spaced apart fingers.

6. An identification system comprising:

a container having an enclosed section for containing a material and a rim extending from said enclosed section having at least one handle opening;

a tag for mounting adjacent to said handle opening, said tag having a body section having an aperture aligned with said handle opening, and at least one insert extending from said body section; and a wireless communication device attached to said tag for identifying said container.

7. The device of claim 6, wherein said container is a beer keg.

8. The device of claim 6, further including a second tag mounted within a second handle opening.

9. The device of claim 6, wherein said insert includes a pair of spaced fingers for mounting the identification tag to said container.

10. The device of claim 9, wherein said handle opening includes flared edges, and said spaced fingers are compressed between said flared edges and said rim.

11. The device of claim 6, wherein said wireless communication device includes a transponder and an antenna.

12. A method of mounting an identification device to a container comprising the steps of:

placing a tag containing a wireless communication device within a rim of a beer keg; and aligning an opening in the tag with a handle opening in the beer keg.

13. The method of claim 12, further including compressing a pair of inserts extending from the tag between a rim and the handle on the beer keg for attaching the tag.

14. The method of claim 12, further including mounting a pair of inserts on opposing sides of the beer keg opening.

15. The method of claim 12, further including applying adhesive to the tag for attaching to the container.

16. A method of monitoring a container comprising the steps of:

inserting a tag containing a wireless communication device onto a container by aligning an opening in the tag with a handle opening on the container;

moving the container through at least one interrogation point containing an interrogation reader; and establishing communication between the identification device and the interrogation reader for monitoring the container.

17. The method of claim 16, further including a central control system in communication with the interrogation point for monitoring the movement of the container.

18. The method of claim 16, wherein the identification device includes a memory for storing information regarding the container, and the identification device communicates the information to the interrogation point.

19. The method of claim 18, wherein the interrogation point delivers information to the identification device which is stored in the memory.

* * * * *